(12) United States Patent
Wintel et al.

(10) Patent No.: US 8,577,837 B2
(45) Date of Patent: Nov. 5, 2013

(54) METHOD AND SYSTEM FOR GENERIC EXTRACTION OF BUSINESS OBJECT DATA

(75) Inventors: Maic Wintel, Walldorf (DE); Martin Mueller, Walldorf (DE)

(73) Assignee: SAP AG, Walldorf (DE)

( * ) Notice: Subject to any disclaimer, the term of this patent is extended or adjusted under 35 U.S.C. 154(b) by 1167 days.

(21) Appl. No.: 11/928,507

(22) Filed: Oct. 30, 2007

(65) Prior Publication Data

US 2009/0112908 A1 Apr. 30, 2009

(51) Int. Cl.
G06F 7/00 (2006.01)
G06F 17/00 (2006.01)

(52) U.S. Cl.
USPC .............................. 707/610; 707/637; 709/248

(58) Field of Classification Search
None
See application file for complete search history.

(56) References Cited

U.S. PATENT DOCUMENTS

| | | | |
|---|---|---|---|
| 6,374,241 B1 * | 4/2002 | Lamburt et al. | 1/1 |
| 6,460,043 B1 * | 10/2002 | Tabbara et al. | 1/1 |
| 7,031,970 B2 * | 4/2006 | Blitzer | 1/1 |
| 7,181,438 B1 * | 2/2007 | Szabo | 1/1 |
| 7,185,075 B1 * | 2/2007 | Mishra et al. | 709/223 |
| 7,236,987 B1 * | 6/2007 | Faulkner et al. | 1/1 |
| 2003/0101190 A1 * | 5/2003 | Horvitz et al. | 707/100 |
| 2003/0144894 A1 * | 7/2003 | Robertson et al. | 705/8 |
| 2003/0154212 A1 * | 8/2003 | Schirmer et al. | 707/103 R |
| 2004/0015783 A1 * | 1/2004 | Lennon et al. | 715/523 |
| 2004/0181775 A1 * | 9/2004 | Anonsen et al. | 717/104 |
| 2005/0050011 A1 * | 3/2005 | Van Der Linden et al. | 707/3 |
| 2005/0138052 A1 * | 6/2005 | Zhou et al. | 707/101 |
| 2005/0138073 A1 * | 6/2005 | Zhou et al. | 707/104.1 |
| 2006/0235742 A1 * | 10/2006 | Castellanos et al. | 705/10 |
| 2007/0156677 A1 * | 7/2007 | Szabo | 707/5 |
| 2007/0198987 A1 * | 8/2007 | Bottger et al. | 719/312 |

OTHER PUBLICATIONS

L. Schlesinger, A. Bauer, W. Lehner, G. Ediberidze, M. Gutzmann. "Efficiently Synchronizing Multidimensional Schema Data" Nov. 9, 2001, ACM 1-581, pp. 69-76.*

* cited by examiner

Primary Examiner — Angelica Ruiz
(74) Attorney, Agent, or Firm — Fish & Richardson P.C.

(57) ABSTRACT

Systems, methods, and software for generic extraction of business object data are provided. One computerized method includes retrieving multiple identifiers of sub-nodes. The sub-nodes are associated with a root node of a business object. The method further includes generating a tree data structure. The tree includes multiple tree nodes and multiple tree edges. The multiple nodes correspond to the root node of the business object and the retrieved multiple identifiers. The method also includes traversing the tree to retrieve data associated with the root business object and the retrieved multiple identifiers. The method further includes storing the retrieved data.

18 Claims, 5 Drawing Sheets

METHOD AND SYSTEM FOR GENERIC EXTRACTION OF BUSINESS OBJECT DATA

TECHNICAL FIELD

This disclosure relates to computer systems and methods and, more particularly, to methods, systems, and software for generic extraction of business object data.

BACKGROUND

Business objects can be represented as trees. A tree is a data structure containing a set of nodes. Nodes are generally connected by a parent-child relationship. The node that has no parent is commonly referred to as a root node. Nodes having no children are commonly referred to as leaf nodes. A path from the root node to another node is defined as the sequence of nodes (from parent to child) that traces the route from the root node to the other node.

Utilizing such data structures, a service-oriented architecture (SOA) application may utilize a Fast Search Infrastructure (FSI) as the general development environment for implementing SOA Query Services. The FSI can provide the development with certain advantages, including less implementation effort (declarative approach and generic Query Service Provider), a generic connection to the underlying search engine, advanced search features provided by the search engine, improved search speed, and model based extensibility (automatic field extensions using Easy Enhancement Workbench (or EEW)). In some cases, the EEW makes the extension of data types with new fields (elements) possible by choreographing the steps. The EEW can call for the Business Object (nodes) a where-uses index for print forms, operational report, and User Interfaces in order to navigate to the extension of these.

SUMMARY

The disclosure provides various embodiments of systems, methods, and software for generic extraction of business object data. In one embodiment, a computerized method includes retrieving multiple identifiers of sub-nodes. The sub-nodes are associated with a root node of a business object. The method further includes generating a tree data structure. The tree includes multiple tree nodes and multiple tree edges. The multiple nodes correspond to the root node of the business object and the retrieved multiple identifiers. The method also includes traversing the tree to retrieve data associated with the root business object and the retrieved multiple identifiers. The method further includes storing the retrieved data.

In another embodiment, software embodied in a computer-readable medium that, when executed by a processor, causes the processor to retrieve a plurality of identifiers of sub-nodes. The sub-nodes are associated with a root node of a business object. The software further causes the processor to generate a tree data structure comprising a plurality of tree nodes and a plurality of tree edges. The plurality of nodes corresponds to the root node of the business object and the retrieved plurality of identifiers. The software further causes the processor to traverse the tree to retrieve data associated with the root business object and the retrieved plurality of identifiers. The software further causes the processor to store the retrieved data.

In another embodiment, a system includes a memory storing one or more business objects and one or more processors. The one or more processors are communicatively coupled to the memory. The one or more processors are operable to retrieve a plurality of identifiers of sub-nodes. The sub-nodes are associated with a root node of a business object. The one or more processors are further operable to generate a tree data structure comprising a plurality of tree nodes and a plurality of tree edges. The plurality of nodes corresponds to the root node of the business object and the retrieved plurality of identifiers. The one or more processors are further operable to traverse the tree to retrieve data associated with the root business object and the retrieved plurality of identifiers. The one or more processors are also operable to store the retrieved data.

Each of the foregoing—as well as other disclosed—example methods may be computer implementable. Moreover, some or all of these aspects may be further included in respective systems and software for generic extraction of business object data. The software, computerized methods, and systems may also include executing a method implemented in the root node. The executed method may return identifiers of all sub-nodes that are to be replicated for the business object. They may also include determining the paths from the root node to each of the sub-nodes.

Traversing the tree may include executing a retrieve method for each tree node of the multiple tree nodes to retrieve data associated with the sub-node corresponding to each tree node. Traversing the tree may also include executing a retrieve by association method for each tree edge to retrieve a second plurality of identifiers of business object nodes. Each edge may include a source node and a target node. The business object nodes may be associated with the sub-node corresponding to the source node of the edge. The retrieve method and the retrieve by association method may return data limited by a page size. Traversing the tree may further include executing a retrieve method for each of the second plurality of identifiers. Traversing the tree may include retrieving data for a first identifier of the retrieved multiple identifiers. The software, computerized methods, and systems may also include deleting at least one identifier used to locate the first identifier, where the deleted identifier(s) is no longer needed.

The software, computerized methods, and systems may also include receiving a request to replicate one or more business objects. Retrieving the plurality of identifiers may include retrieving one or more of a plurality of identifiers corresponding to each of the one or more business objects. Generating the tree may include generating one or more trees corresponding to each of the one or more business objects. Traversing the tree may include traversing each of the one or more trees. Retrieving multiple identifiers of sub-nodes may include retrieving a first subset of the multiple identifiers of sub-nodes. The first subset may be based on a page size. Retrieving multiple identifiers of sub-nodes may further include retrieving a second subset of the multiple identifiers of sub-nodes. The second subset may be based on the page size.

The details of one or more embodiments of the invention are set forth in the accompanying drawings and the description below. Other features, objects, and advantages of the invention will be apparent from the description and drawings, and from the claims.

DETAILED DESCRIPTION

At a high level, the present disclosure involves techniques that embody a "select all" approach that is modeled at the root node of a business object. Such an approach can be used by SOA applications, then successive retrieve and retrieve-by-association calls can be executed on the business objects to fetch the initial load data in a tree walk approach. In addition, the "select all" approach supports paging for packaging of the data set of the root.

Figure 1A:
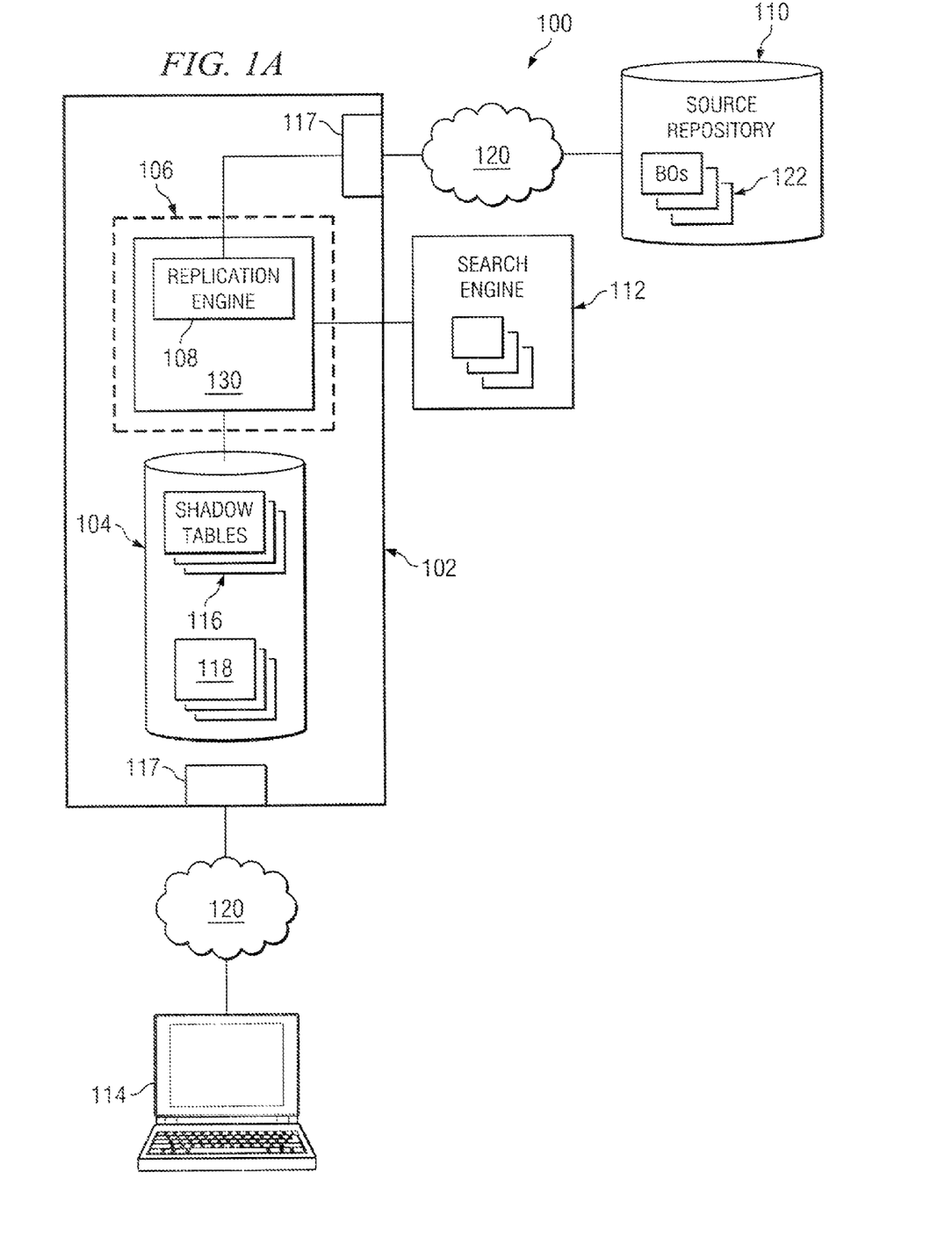
FIG. 1A illustrates an example system for generic extraction of business object (BO) data.

FIG. 1A illustrates one example system 100 for this generic extraction of business object (BO) data. Generally, system 100 retrieves identifiers of business object nodes associated with a root business node from source repository 110 and performs a tree walk approach to retrieve the data associated with the business object nodes before storing them in data store 104. The identifiers are retrieved by executing a query that retrieves the keys that are associated with the root node. The retrieved identifiers are then used in a tree walk approach where successive retrieve and retrieve-by-association queries are performed on the corresponding business objects to retrieve the data associated with each corresponding business object. The retrieved data is stored in a data store. In some cases, the disclosed techniques can offer increased stability and/or lower effort and development costs for business object owners and managers, as well as the simplicity of having a single generic query. Moreover, paging may be implemented because of high cardinalities where a root node may have hundreds of thousands of child nodes.

Figure 2A:
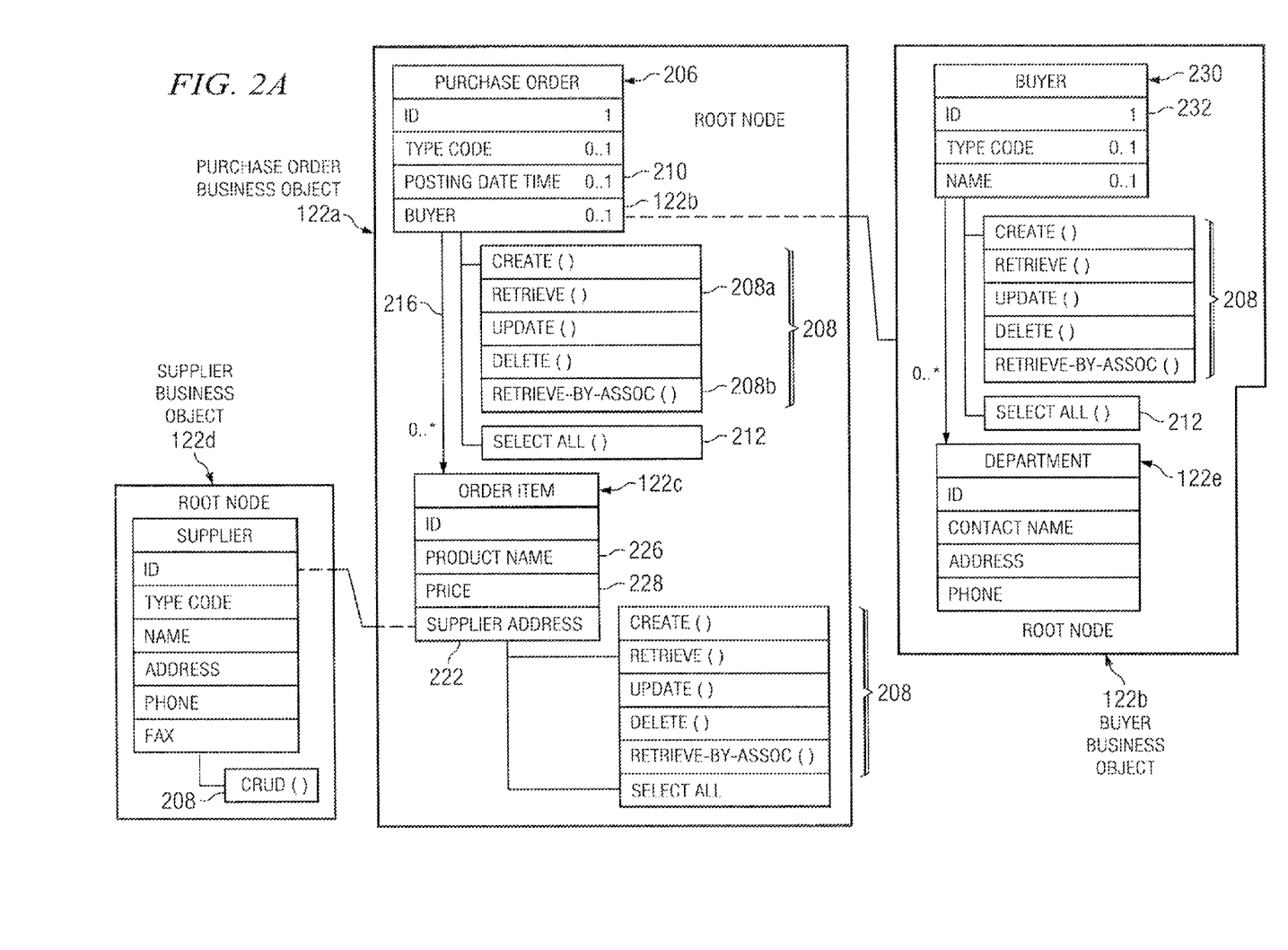
FIG. 2A depicts an example BO model for a purchase order business object.
Figure 2B:
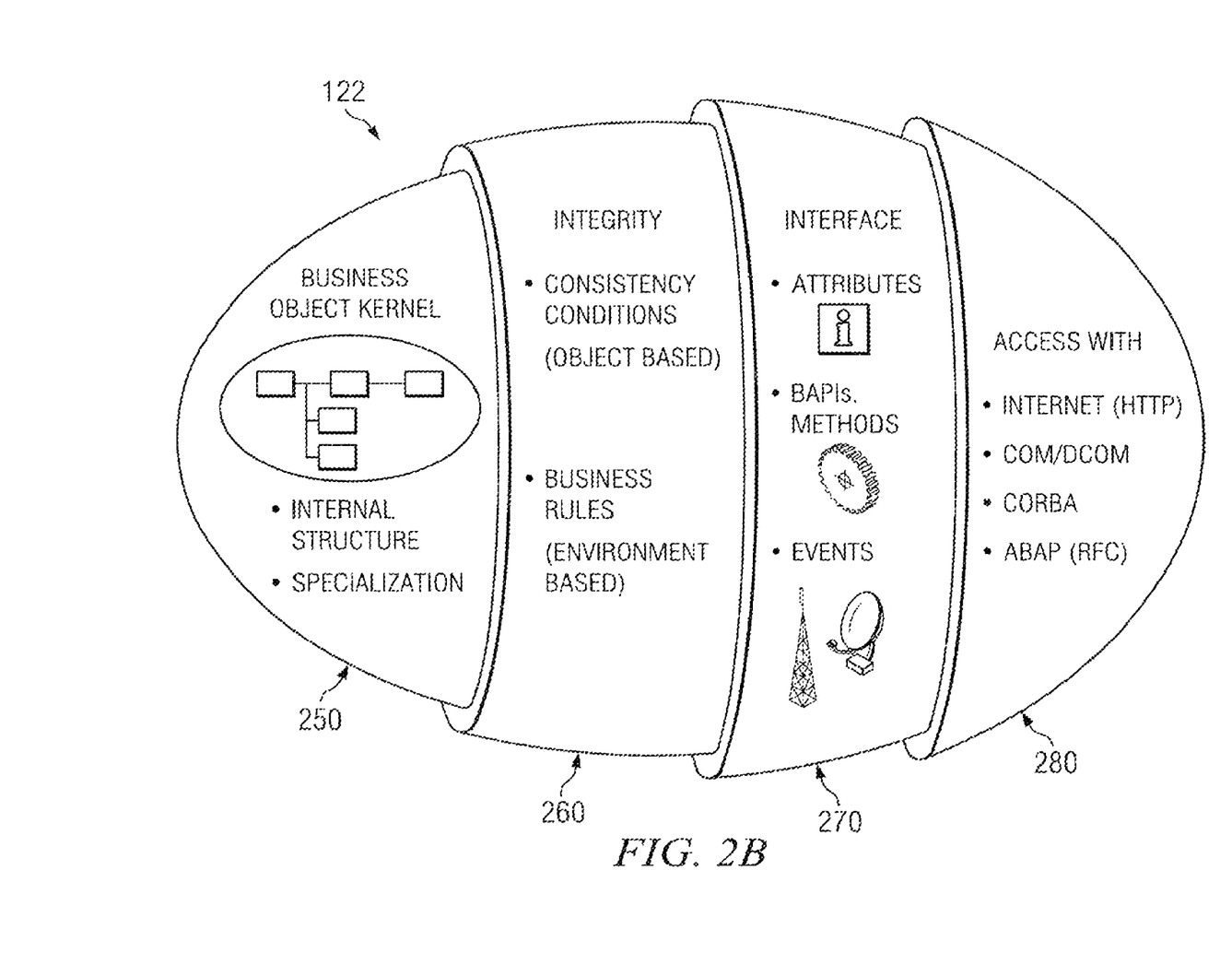
FIG. 2B depicts a graphical representation of a BO.

At a high level, a business object (BO) is a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with customer relationship management (CRM) below finance and supplier relationship management (SRM) below CRM. For example, FIG. 2B depicts one graphical representation of a generic BO 122. The BO 122 is a representation of any suitable business entity, such as an employee or a sales order. The BO 122 may encompass both functions, generally in the form of methods, and data, such as attributes of the business entity. A dependent object (DO) is a BO that is used in or by another BO, such as an order item 122c in a purchase order 122a (as shown in FIG. 2A). A hosting object (HO), such as the purchase order 122a, is the object which references a dependent object, such as the order item 122c. The hosting object has to implement the association between the two objects. Associations between a hosting object and its dependent objects may be determined by executing a retrieve-by-association method 208b call on the hosting object. The attributes for an object may be obtained by executing a retrieve method 208a call on the business object node.

The implementation details of a BO 122 are typically hidden from a non-development user, such as an end user, and the BO may be accessed through defined functions. Accordingly, the BO 122 may be considered encapsulated. BO 122 may be used to reduce a system into smaller, disjunctive units. As a result, BOs 122 improve a system's structure while reducing system complexity. BOs 122 also form a point of entry of the data and functions of a system and enable the system to easily share data, communicate, or otherwise operate with other systems. According to one implementation, BO 122 may include multiple layers.

The innermost layer of the example BO 122 is the kernel layer 250. The kernel layer 250 represents the business object's inherent data, containing various attributes of the defined business object. Inherent data may include, for example, an employee's name, age, status, position, address, etc. The second layer represents the integrity layer 260. In the example business object 122, the integrity layer 260 contains the business logic of the object. Such logic may include business rules for consistent embedding in the environment 100 and the constraints regarding the values and domains that apply to the business object 122. Business logic may comprise statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object 122. The third layer, the interface layer 270, may supply the valid options for accessing the business object 122 and describe the implementation, structure, and interface of the business object to the outside world. To do so, the interface layer 270 may contain methods, input event controls, and output events. The fourth and outermost layer of the business object 122 is the access layer 280. The access layer 280 defines the technologies that may be used for external access to the business object's 122 data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects 122 of this embodiment may implement standard object-oriented technologies such as encapsulation, inheritance, and/or polymorphism.

Accordingly, the third layer 270 separates the inherent data of the first layer 250 and the technologies used to access the inherent data. As a result of the described structure, the BO 122 reveals only an interface that includes a set of clearly defined methods. Thus, applications typically access the BO 122 via those defined methods. An application wanting access to the BO 122 and the data associated therewith must include the information or data required to execute the clearly defined methods of the BO's interface 270. The clearly defined methods of the BO's interface 270 represent the BO's behavior. That is, when the methods are executed, the methods may change the BO's data 250. Therefore, an application may utilize any BO 122 by providing the required information or data without having any concern for the details related to the internal operation of the BO 122.

To ensure the consistency of interfaces, the business object model may be built using standardized data types as well as packages to group related elements together, and package templates and entity templates to specify the arrangement of packages and entities within the structure.

Data types are used to type object entities and interfaces with a structure. This typing can include business semantic. For example, the data type "BusinessTransactionDocumentID" is a unique identifier for a document in a business transaction. Also, as an example, Data type "BusinessTransactionDocumentParty" contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities. Packages group the entities in the business object model and the resulting interfaces into groups of semantically associated information. Packages also may include "sub"-packages, i.e., the packages may be nested.

The foregoing business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Generally, BOs, their nodes, and their services are modeled. Updates using these services enable Create Read Update Delete (CRUD) actions. These methods may trigger an After Save Event for possible changes to a BO node, instances of which can be replicated and are updateable. That often means that updates of the node instance are propagated via a change handler and the corresponding Node IDs are stable across several sessions. In some cases, calculated fields for selection are calculated based on the instance of the BO it belongs to. Attributes for join building are typically BO node attributes (foreign key relations between BO nodes) and associations implemented in the back end are not used as joins.

Turning to overall FIG. 1A, the illustrated example system 100 is a distributed client/server system that spans one or more networks such as network 120. Rather than being delivered as packaged software, system 100 may represent a hosted solution, often for an enterprise or other small business, that may scale cost-effectively and help drive faster adoption. In this case, portions of the hosted solution may be developed by a first entity, while other components are developed by a second entity. These entities may participate in any suitable form of revenue or cost-sharing as appropriate. Moreover, the processes or activities of the hosted solution may be distributed amongst these entities and their respective components. For example, system 100 may provide a source repository 110 for storing business objects, while a third party may provide the actual business objects 122. Further, system 100 may store data (user, transaction, service provider, and such) at a relatively central location (over WAN), while concurrently maintaining local data at the client 114 for redundancy and to allow processing during downtime. But system 100 may be in a dedicated enterprise environment—across a local area network (over LAN) or subnet—or any other suitable environment without departing from the scope of this disclosure.

System 100 includes, or is communicably coupled with, server 102, a client 114, and a source repository 110, at least some of which may communicate across network 120. Server 102 comprises an electronic computing device operable to receive, transmit, process and store data associated with system 100. Each computer is generally intended to encompass any suitable processing device. For example, although FIG. 1A illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server.

As illustrated, server 102 includes data store 104 and a processor 106. The data store 104 may also be remote and connected to server 102 through a network, such as network 120. The data store 104 may be incorporated in or communicatively coupled with source repository 110. The data store 104 is computer readable media suitable for storing computer program instructions and data. The data store 104 may be any form of non-volatile memory, media and memory devices, including by way of example random access memory (RAM), read-only memory (ROM), or other memory devices, such as, e.g., EPROM, EEPROM, and flash memory devices; magnetic disks, e.g., internal hard disks or removable disks; magneto optical disks; and CD ROM and DVD-ROM disks. The data store 104 may include shadow tables 116 and temporary memory 118. Although shown separately, the data store 104 may also include replication engine 108.

Shadow tables 116 may store business object data that has been replicated. The shadow tables 116 may or may not correspond to the organization of the business object data. Each BO node may have a corresponding shadow table 116. The shadow table 116 may not contain all of the attributes of a corresponding BO node. In some embodiments, some or all of the foregoing data structures may be stored in one or more tables in a relational database described in terms of SQL statements or scripts. In some alternative or complimentary situations, some or all of the foregoing data structures may be formatted, stored, or defined as various data structures in text files, eXtensible Markup Language ("XML") documents, Virtual Storage Access Method ("VSAM") files, flat files, Btrieve files, comma-separated-value ("CSV") files, internal variables, or one or more libraries. In short, the foregoing data structures may comprise one table or file or a plurality of tables or files stored on one computer or across a plurality of computers in any appropriate format. Indeed, some or all of the foregoing data structures may be local or remote without departing from the scope of this disclosure and store any type of appropriate data.

Server 102 also includes processor 106. Processor 106 executes instructions and manipulates data to perform the operations of server 102 such as, for example, a central processing unit (CPU), a blade, an application specific integrated circuit (ASIC), or a field-programmable gate array (FPGA). Generally, the processor 106 will be operatively coupled to receive data and/or instructions from, or transfer data to, the data store 104. The processor 106 and some or all of the data stored in the data store 104 can be supplemented by, or incorporated in, special purpose logic circuitry, such as an ASIC.

Server 102 may also include or reference a local, distributed, or hosted replication engine 108. At a high level, replication engine 108 is any application, program, module, process, or other software that may access, retrieve, modify, delete, or otherwise manage some information of the shadow tables 116, of the temporary memory 118 in data store 104, and of the source repository 110. Regardless of the particular implementation, "software" may include software, firmware, wired or programmed hardware, or any combination thereof as appropriate. Indeed, software may be written or described in any appropriate computer language including C, C++, Java, J#, Visual Basic, assembler, Perl, any suitable version of 4GL, as well as others. Specifically, replication engine 108 may access the source repository 110 to retrieve references to business object nodes associated with a business object 122 and store the references in the temporary memory 118. The replication engine 108 may then generate a tree data structure based on the retrieved reference nodes. The replication engine 108 may then traverse and use the reference nodes of the tree to retrieve data associated with the business object nodes from the source repository 110 and subsequently store the data in the shadow tables 116. The replication engine 108 can be part of or coupled with a fast search infrastructure (FSI) 130.

In those cases, the replication engine 108 may be used to load the initial data for the FSI 130. The FSI 130 generally serves as a general development environment for implementing query services for a business application, often in an SOA platform. For example, in certain implementations, the developers may enable FSI search capabilities within SOA applications by following some or all of the following example steps:

1. Define the BO within an Enterprise Service Repository (ESR). The definition typically includes BO nodes and query services for search processing belonging to these nodes.
2. Define a query for the root BO node that delivers keys of the node. By convention, the name of the query is SelectAll.
3. Generate the BO using a transaction proxy.
4. Register the generic query service provider as its query service provider for the query implemented by FSI 130.
5. Implement BO query services using FSI.
6. Activate the View (this creates and persists data to the shadow tables).
7. Replicate data to the search engine.

The FSI 130 may provide tools to application developers that help them construct queries directed at business object data. For example, tools may be provided to identify the data objects (BO nodes) that are required for the query execution. The replication engine 108 may then be used to store data objects automatically in the shadow tables 116, and may replicate the data to the search engine 112 afterwards.

A search engine 112 may be any combination of software that performs searches on business object data. One example of a search engine 112 is a Search and Classification tool that finds information in both structured and unstructured data. Various kinds of searches may be supported by the search engine 112, such as text, boolean, wildcard, linguistic, and fuzzy searches. In some embodiments, the replication engine 108 may create an index on the search engine for each data source it replicates.

The FSI 130 may support views that contain data-modelling definitions and view-field definitions. The views may be used to encapsulate data modelling details, such as join relations between the several BO nodes. They may also hide the actual data sources by providing view fields into BO node attributes, which may be the only components that allow the attributes to be viewed from the outside. View fields, like views, may represent a logical collection of data. The metadata for an FSI view may act as the basis for data replication by describing which data or BO nodes must be replicated to the shadow tables 116 and into the search engine 112. The FSI view, once defined and activated, may be reused as a data source within another view, as if the FSI view were a BO node.

The FSI 130 may provide an automatic internal client handling during query execution and data replication, where in this sense a client is a host of business object data. During business object replication, a reference to the client associated with the data is also typically stored within the secondary persistency. If data exists in several clients of the system, the replication may be started in each client.

A tool to create views may be implemented in the FSI 130. An FSI view builder tool may allow application developers to design views, view fields, and fast search queries in an intuitive graphical user interface. Each view field may represent an alias for business object node-attribute pair that is visible from the outside. The FSI may support complex query building, by allowing a developer to define a join condition on multiple BO nodes. The user interface for the view builder tool may be created using an application. A join builder tool may be used to load BO node descriptions and define join conditions between BO nodes to facilitate creating joins such as, for example, left outer joins and inner joins. The tool may also allow creation of views using Structured Query Language (SQL).

Figure 1B:
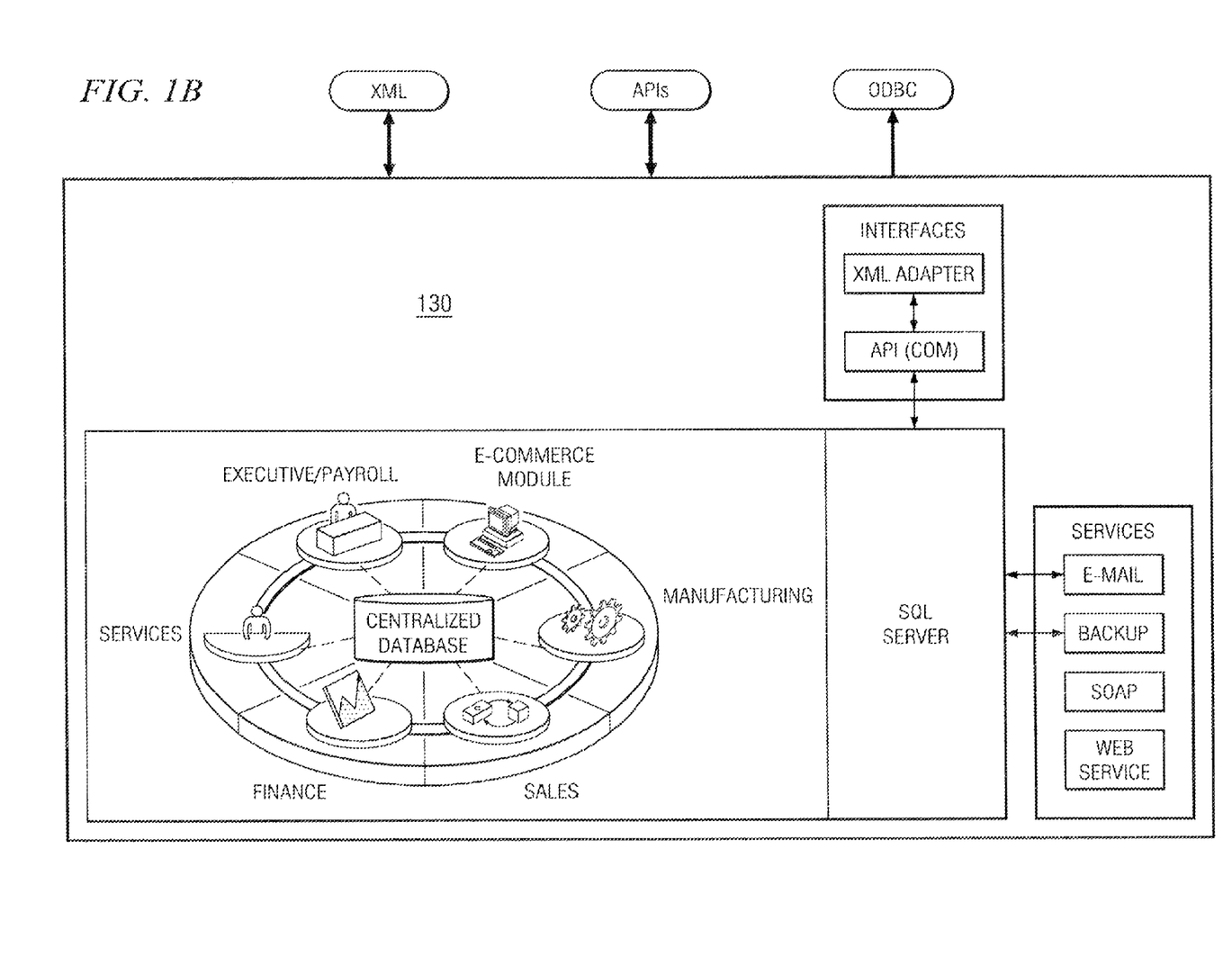
FIG. 1B illustrates an example composite application that may be implemented in the system illustrated in FIG. 1A.

Some or all of FSI 130 may be incorporated in, or itself be, a composite business application 130, an example of which is illustrated in FIG. 1B. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 130 is illustrated in FIG. 1B as including various sub-modules, application 130 may include numerous other sub-modules or may instead be a single multi-tasked module that implements the various features and functionality through various objects, methods, or other processes. Further, while illustrated as internal to server 102, one or more processes associated with application 130 may be stored, referenced, or executed remotely. For example, a portion of application 130 may be a web service that is remotely called, while another portion of application 130 may be an interface object bundled for processing at remote client 114. Moreover, application 130 may be a child or sub-module of another software module or enterprise application (not illustrated) without departing from the scope of this disclosure. Indeed, application 130 may be a hosted solution that allows multiple parties (such as the manufacturer, a vendor, and a customer) in different portions of the process to perform the respective processing.

More specifically, as illustrated in FIG. 1B, application 130 may be a composite application, or an application built on other applications, that includes an object access layer (OAL) and a service layer. In this example, application 130 may execute or provide a number of application services, such as CRM systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 130 may run on a heterogeneous IT platform. In doing so, composite application may be cross-functional in that it may drive business processes across different applications, technologies, and organizations. Accordingly, composite application 130 may drive end-to-end business processes across heterogeneous systems or subsystems. Application 130 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 130, it may instead be a standalone or (relatively) simple software program. Regardless, application 130 may also perform processing automatically, which may indicate that the appropriate processing is substantially performed by at least one component of system 100. It should be understood that automatically further contemplates any suitable administrator or other user interaction with application 130 or other components of system 100 without departing from the scope of this disclosure.

Returning to FIG. 1A, server 102 may also include interface 117 for communicating with other computer systems, such as clients 104, over network 120 in a client-server or other distributed environment. In certain embodiments, server 102 receives data from internal or external senders through interface 117 for storage in data store 104 and/or processing by processor 106. Generally, interface 117 comprises logic encoded in software and/or hardware in a suitable combination and operable to communicate with network 120. More specifically, interface 117 may comprise software supporting one or more communications protocols associated with communications network 120 or hardware operable to communicate physical signals.

Client 114 is any local or remote computing device operable to receive requests from the user via a user interface, such as a GUI, a CLI (Command Line Interface), or any of numerous other user interfaces. Thus, where reference is made to a particular interface, it should be understood that any other user interface may be substituted in its place. In various embodiments, each client 114 includes at least user interface and comprises an electronic computing device operable to receive, transmit, process and store any appropriate data associated with environment 100. It will be understood that there may be any number of clients 114 communicably coupled to server 102. Further, "client" and "user" may be used interchangeably as appropriate without departing from the scope of this disclosure. Moreover, for ease of illustration, each client 114 is described in terms of being used by one user. But this disclosure contemplates that many users may use one computer or that one user may use multiple computers to submit or review queries via user interface. As used in this disclosure, client 114 is intended to encompass a personal computer, touch screen terminal, workstation, network computer, kiosk, wireless data port, wireless or wireline phone, personal data assistant (PDA), one or more processors within these or other devices, or any other suitable processing device. For example, client 114 may comprise a computer that includes an input device, such as a keypad, touch screen, mouse, or other device that can accept information, and an output device that conveys information associated with the operation of server 102 or clients 114, including digital data, visual information, or a user interface. Both the input device and output device may include fixed or removable storage media such as a magnetic computer disk, CD-ROM, or other suitable media to both receive input from and provide output to users of client 114 through the display, namely, a user interface.

Network 120 facilitates wireless or wireline communication between computer server 102 and any other local or remote computer, such as client 114. Indeed, while illustrated as one network, network 120 may be a logically segregated or distributed network without departing from the scope of this disclosure, so long as at least portion of network 120 may facilitate communications between senders and recipients of requests and results. In other words, network 120 encompasses any internal and/or external network, networks, sub-network, or combination thereof operable to facilitate communications between various computing components in system 100. Network 120 may communicate, for example, Internet Protocol (IP) packets, Frame Relay frames, Asynchronous Transfer Mode (ATM) cells, voice, video, data, and other suitable information between network addresses. Network 120 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation, the FSI replication engine handles replication requests on node level of the same business object. For example, the engine expects a list of nodes for which data should be replicated. It is also possible to hand over single node id for which the data should be replicated into FSI persistency. After checking if the replication requests are valid, the path from the root node to the replication nodes is determined. The paths are normally unique since parent-child-associations of the business object model are used. Using those paths, the replication graph is built up. Per construction, the graph is a tree where all leaves are replication nodes. In addition, any of the other nodes might be replication nodes. The root node of the tree is the root node of the business object.

An iterator traverses the replication tree (perhaps using a Depth First Search (DFS) algorithm) and returns an association (when stopping on edge) or a replication node (when stopping on node which is to be replicated). If the iterator returns an association, the core service retrieve by association is executed otherwise the retrieve is executed. The node IDs that have been returned via retrieve by association are pushed into the replication store. Node IDs that are needed for retrieve or as source node ids for retrieve by association are taken from the store. Both pushing into and taking from the replication store are typically done in packages with fixed size (internal page size). Therefore, retrieves and retrieve by associations are executed in packages. If a retrieve is done on a leaf node, an event is raised that triggers deleting of node IDs in the store that are no longer needed. This reduces memory consumption and eases swapping into a database if memory runs low due to a large number of node IDs.

For example, system 100 may replicate purchase order business object 122a (as depicted in FIG. 2A), which may be stored in the source repository 110. Purchase order business object 122a may include a purchase order root node 206. The purchase order root node 206 may be associated with a plurality of purchase order business object sub-nodes or instances. A business object instance may have associated with it an instance of a buyer business object 122b, and instances of order items 122c. An instance of an order item 122c may have associated with it an instance of a supplier business object 122d. Each business object 122 may implement core services, methods, or interfaces 208, some of which may allow the business object to be queried for its associated data. For example, a given business object 122 may implement a SelectAll method 212, which when executed may return references or identifiers to all business object instances or sub-nodes that are associated with the given business object. A retrieve service 208a may be implemented to return the keys associated with a particular business object instance. Retrieve-by-association service 208b may also be implemented to return the business object instances that are dependent objects for a particular hosting object.

A user may activate an FSI 130 view. In response, system 100 may generate corresponding shadow tables 116 in the underlying data store 104. The shadow tables 116 are transparent database tables that allow fast selection in the run-time environment. BO nodes that are involved in a FSI view may have underlying shadow tables 116. The BO node attributes that are used in one or more FSI views may also be replicated in the shadow tables 116. After the shadow tables 116 are created, the initial load process may begin. The initial load, by default, may be executed automatically after the FSI view is created.

The replication engine 108 may receive a request to replicate a certain BO node, such as purchase order root node 206. The replication engine 108 may execute the select all method 212 to retrieve all the references to sub-nodes or node identifiers associated with instances of purchase order business object 202. The select all method 212 may be implemented to execute in a paging mode, where the method 212 returns a fixed amount of data (a page) or maximum number of node identifiers at a time. If paging is used, then the replication engine 108 may request the next page using the select all method 212 and the last node identifier retrieved in the previous page. The replication engine 108 may store the retrieved node identifiers in the temporary memory 118 and may generate a tree by determining the path from the purchase order root node 206 to each of the retrieved node identifiers. The tree is an arrangement of nodes, representing instances of business objects, and edges, defining the association between the instances of business objects. In this example, the root node of the tree is the purchase order root node 206 of the business object 202 and the other nodes of the tree are the instances of the purchase order business object.

The replication engine 108 may iterate through the tree 250 using a tree walk approach to retrieve the data needed for replication. If while traversing the tree, the replication engine 108 encounters a node that needs to be replicated, the replication engine 108 may execute a retrieve service call on the node to return the associated data for the node. For example, the retrieve method call 224 may be executed for a purchase order instance, which may return the posting date time 210, or for an order item instance, which may return the product name 226 and the price 228.

During the traversal process, the replication engine 108 may encounter an edge. In those cases, the replication engine 108 may execute a retrieve-by-association method call 208b to return the node identifiers that are associated with the instance of the source node. The retrieve-by-association 208b call may process a relation between different types, such as a parent/child association, an association between nodes within a business object, or an association to other business objects. For example, the order item 220 may be associated with a supplier business object 122d and supplier attributes 222. By executing the retrieve-by-association method 244 on the order item 220, the replication engine 108 may obtain the reference to the instance of the supplier business object 242 to replicate the supplier address 222. In certain embodiments, replication engine 108 may use a depth-first search (DFS) algorithm to traverse the tree.

The references to the nodes returned from the retrieve-by-association method call may be pushed into the temporary memory 118 along with the node identifiers retrieved from the select all 212 method. These references or node identifiers may be retrieved or popped from the temporary memory 118 and used to execute further retrieve and retrieve-by-association method calls. The pushing and popping of node identifiers from the temporary memory 118 may be performed in packages with a fixed size. The fixed size may be based on an internal page size. When the node identifiers are retrieved in packages, the retrieve and retrieve-by-association method calls may be executed also in packages. If a retrieve is done on a leaf node, that is, one that has no children associated with it, then node identifiers in the temporary memory 118 that are no longer needed may be deleted. For example, when the supplier address 222 of an instance of an order item 122c is replicated, the node identifier of the instance of the supplier object 122d which contained the supplier address may be deleted. This may reduce memory consumption and facilitates swapping if available memory capacity decreases due to a large number of stored node identifiers.

The data retrieved for each BO node may be stored in the corresponding shadow tables 116. The initial load of data to the search engine 112 may be started in parallel or after the loading of the data into the shadow tables 116. The FSI 130 and/or replication engine 108 may also provide monitoring to facilitate synchronization of data between the search engine 112, shadow tables 116, and the source repository 110.

Figure 3:
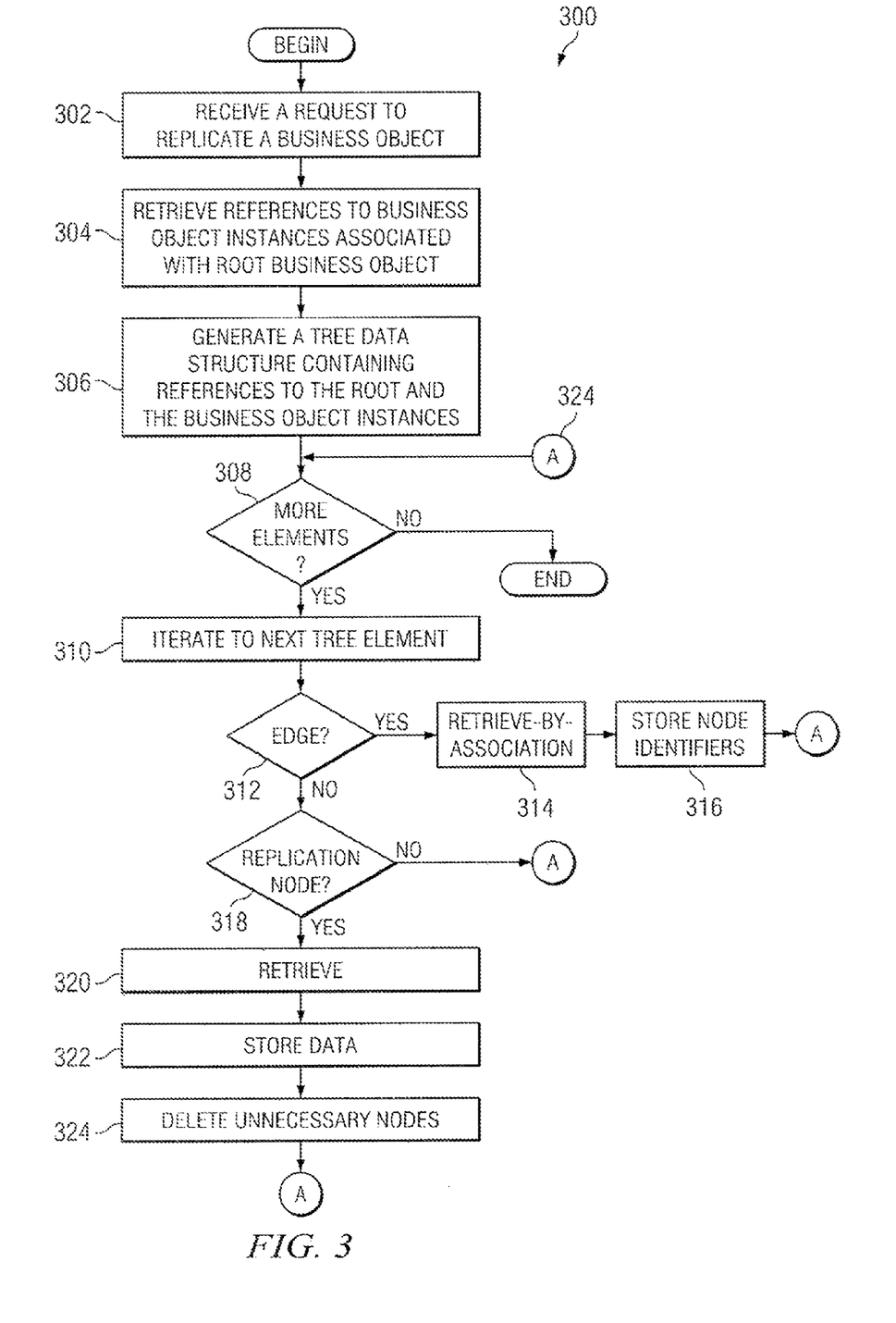
FIG. 3 is a flowchart of an example method for generic extraction of BO data.

FIG. 3 is a flowchart illustrating an example method 300 for one aspect of generic extraction of business object data using system 100. Generally, method 300 describes the extraction and replication of business object data using a tree walk approach by the appropriate software, such as replication engine 100. At step 302, a request to replicate a business object is received. The request may contain a node identifier of the business object root node or it may contain parameters that allow the business object root node to be located. The request may also be to replicate multiple business objects. At step 304, the references to business object instances that are associated with the root business object are obtained. The references to the business objects instances may be node identifiers of the business object. A select all service may be implemented for the root business object that returns all of the node references that should be replicated when executed. The select all method may return those business object instances that need to be replicated and may not return other instances that contain bad data, or are otherwise immaterial. The references may be stored in memory for use when retrieving data associated with each reference. The select all method may be a generic method that is implemented by all business objects that may be replicated using system 100.

At step 306, a tree data structure containing the root business object node identifier and the retrieved node identifiers of the business object instances may be generated. The tree may be constructed based on the paths from the business object node to the associated business object instances. At step 308, the process of traversing the tree begins by determining whether there are more elements in the tree that need to be visited. The tree may be traversed using a tree walk approach. The determination of the order in which the tree is traversed may be determined based on a DFS algorithm.

If there are no more tree elements remaining, the method ends. If there are more elements, then at step 310 the system references the next element and determines at step 312 whether the element is an edge of the tree. If it is an edge, then at step 314, the retrieve-by-association method is called using the source node of the edge that was referenced at step 310. Any node identifiers that are returned at step 314 are stored at step 316 to be used for subsequent retrieve and retrieve-by-association calls and the next iteration continues at step 308. If the next element in the tree is not an edge, then at step 318 the system determines if the next element is a replication node. If not, then the next iteration continues at step 308. If, at step 318, it is determined that the node is a replication node, then at step 320, the data associated with that node is retrieved using a retrieve method call. Any retrieved data is stored at step 322 and any unneeded stored node identifiers used to locate the replication node may be deleted at step 324. The next iteration continues at step 308.

The preceding flowchart and accompanying description illustrate example method 300. It will be understood that this illustrated method is for example purposes only and that the described or similar techniques or processes may be performed at any appropriate time, including concurrently, individually, or in combination. In addition, many of the steps in this flowchart may take place simultaneously and/or in different orders than as shown. Moreover, methods may be used with additional steps, fewer steps, and/or different steps, so long as the methods remain appropriate.

A number of embodiments of the invention have been described. Nevertheless, it will be understood that various modifications may be made without departing from the spirit and scope of the invention. For example, pre-processing and post-processing steps may be performed before and after replicating nodes. Accordingly, other embodiments are within the scope of the following claims.

What is claimed is:

1. A computer-implementable method performed with one or more computers, comprising:
   identifying a business object in a service-oriented architecture platform for replication;
   retrieving a plurality of identifiers of sub-nodes based on a root node of the business object, wherein each sub-node is an instance of the business object;
   generating, with a processor, a tree data structure comprising a plurality of tree nodes and at least one tree edge, wherein each of the plurality of tree nodes correspond to the business object or one of the retrieved plurality of identifiers;
   traversing the tree to identify at least one tree node in the plurality of tree nodes for replication by executing, with a replication engine, a depth first search algorithm that begins the traversal at the root node of the business object and iteratively continues the traversal to each of the plurality of tree nodes;
   identifying a corresponding sub-node associated with the business object to retrieve data for replication;
   executing a retrieve method for each tree node of the plurality of tree nodes to retrieve data associated with the corresponding sub-node;
   executing a retrieve by association method for each tree edge to retrieve a second plurality of identifiers of business object nodes, wherein each tree edge comprises a source node and a target node, and wherein the business object nodes are associated with the sub-node corresponding to the source node of the tree edge; and
   storing the retrieved data in a computer-readable media.

2. The method of claim 1, wherein retrieving the plurality of identifiers comprises executing a method invoked within the root node, wherein the method returns identifiers of all sub-nodes for replication.

3. The method of claim 1, wherein generating the tree data structure comprises automatically determining the paths from the root node to each of the sub-nodes.

4. The method of claim 1, wherein the retrieve method and the retrieve by association method return data limited by a page size.

5. The method of claim 1 further comprising executing a retrieve method for each of the second plurality of identifiers.

6. The method of claim 1, wherein traversing the tree comprises retrieving data for a first identifier of the retrieved plurality of identifiers, and the method further comprises deleting at least one identifier used to locate the first identifier, wherein the at least one identifier is no longer needed.

7. The method of claim 1 further comprising receiving a request to replicate one or more business objects, wherein retrieving the plurality of identifiers comprises retrieving one or more plurality of identifiers corresponding to each of the one or more business objects, wherein generating the tree comprises generating one or more trees corresponding to each of the one or more business objects, and wherein traversing the tree comprises traversing each of the one or more trees.

8. The method of claim 1, wherein retrieving a plurality of identifiers of sub-nodes comprises retrieving a first subset of the plurality of identifiers of sub-nodes, wherein the first subset is based on a page size; and retrieving a second subset of the plurality of identifiers of sub-nodes, wherein the second subset is based on the page size.

9. A computer-program product residing on a tangible, non-transitory storage medium, comprising computer instructions that when executed by a processor is operable to:
   identify a business object in a service-oriented architecture platform for replication;
   retrieve a plurality of identifiers of sub-nodes based on a root node of the business object, wherein each sub-node is an instance of the business object;

generate a tree data structure comprising a plurality of tree nodes and at least one tree edge, wherein each of the plurality of tree nodes correspond to the business object or one of the retrieved plurality of identifiers;

traverse the tree to identify at least one tree node in the plurality of tree nodes for replication by executing, with a replication engine, a depth first search algorithm that begins the traversal at the root node of the business object and iteratively continues the traversal to each of the plurality of tree nodes;

identify a corresponding sub-node associated with the business object to retrieve data for replication;

execute a first retrieve method for each tree node of the plurality of tree nodes to retrieve data associated with the sub-node corresponding to each tree node; and execute a second retrieve method for each tree edge to retrieve a second plurality of identifiers of business object nodes, wherein each tree edge comprises a source node and a target node, and wherein the business object nodes are associated with the sub-node corresponding to the source node of the tree edge; and store the retrieved data as an initial load.

10. The computer-program product of claim 9, the instructions further operable to execute a method invoked within the root node, wherein the method returns identifiers of all sub-nodes for replication.

11. The computer-program product of claim 9, the instructions further operable to determine the paths from the root node to each of the sub-nodes.

12. The computer-program product of claim 9, wherein the first retrieve method and the second retrieve method return data limited by a page size.

13. The computer-program product of claim 9, the instructions further operable to execute a retrieve method for each of the second plurality of identifiers.

14. The computer-program product of claim 9, the instructions further operable to:
retrieve data for a first identifier of the retrieved plurality of identifiers; and
delete at least one identifier used to locate the first identifier, wherein the at least one identifier is no longer needed.

15. The computer-program product of claim 9, the instructions further operable to:
receive a request to replicate one or more business objects;
retrieve one or more plurality of identifiers corresponding to each of the one or more business objects;
generate one or more trees corresponding to each of the one or more business objects; and
traverse each of the one or more trees to retrieve data associated with each of the one or more business objects.

16. The computer-program product of claim 9, the instructions further operable to:
retrieve a first subset of the plurality of identifiers of sub-nodes, wherein the first subset is based on a page size; and
retrieve a second subset of the plurality of identifiers of sub-nodes, wherein the second subset is based on the page size.

17. A system for managing a process, comprising:
memory storing one or more business objects; and
one or more processors communicatively coupled to the memory, operable to:
identify a business object in a service-oriented architecture platform for replication;
retrieve a plurality of identifiers of sub-nodes based on a root node of the business object, wherein each of the sub-nodes is an instance of the business object;
generate a tree data structure comprising a plurality of tree nodes and a plurality of tree edges, wherein each of the plurality of nodes correspond to the business object or one of the retrieved plurality of identifiers;
traverse the tree to identify at least one node in the plurality of tree nodes for replication by executing, with a replication engine, a depth first search algorithm that begins the traversal at the root node of the business object and iteratively continues the traversal to each of the plurality of tree nodes;
identify a corresponding sub-node associated with the business object to retrieve data for replication;
execute a retrieve method for each tree node of the plurality of tree nodes to retrieve data associated with the sub-node corresponding to each tree node; and
execute a retrieve by association method for each tree edge to retrieve a second plurality of identifiers of business object nodes, wherein each tree edge comprises a source node and a target node, and wherein the business object nodes are associated with the sub-node corresponding to the source node of the tree edge; and
store the retrieved data in the memory.

18. The system of claim 17 wherein the processor is further operable to:
receive a request to replicate one or more business objects;
retrieve one or more plurality of identifiers corresponding to each of the one or more business objects;
generate one or more trees corresponding to each of the one or more business objects; and
traverse each of the one or more trees to retrieve data associated with each of the one or more business objects.

* * * * *